(12) United States Patent
Chien et al.

(10) Patent No.: US 8,190,454 B2
(45) Date of Patent: May 29, 2012

(54) PROCESS APPARATUS AND MUTUAL INSURANCE METHOD PERFORMED BY THE PROCESS APPARATUS

(75) Inventors: Yung-Sung Chien, Taipei (TW); Frank Kuen-Bao Ling, Taipei (TW)

(73) Assignee: Shacom. Com Inc., Taipei (TW)

( * ) Notice: Subject to any disclaimer, the term of this patent is extended or adjusted under 35 U.S.C. 154(b) by 426 days.

(21) Appl. No.: 12/397,582

(22) Filed: Mar. 4, 2009

(65) Prior Publication Data

US 2009/0228308 A1    Sep. 10, 2009

(30) Foreign Application Priority Data

| Mar. 5, 2008 | (TW) | 97107607 A |
| Mar. 28, 2008 | (TW) | 97111255 A |
| May 19, 2008 | (TW) | 97118322 A |
| Feb. 19, 2009 | (TW) | 98105197 A |

(51) Int. Cl.
    *G06Q 40/00* (2006.01)

(52) U.S. Cl. .......................................................... 705/4

(58) Field of Classification Search ........................ 705/4
    See application file for complete search history.

(56) References Cited

U.S. PATENT DOCUMENTS 4,831,526 A * 5/1989 Luchs et al. ...................... 705/4
6,260,024 B1    7/2001 Shkedy

* cited by examiner

*Primary Examiner* — Ojo O Oyebisi
(74) *Attorney, Agent, or Firm* — Grossman, Tucker, Perreault & Pfleger, PLLC

(57) ABSTRACT

A process apparatus and a mutual insurance method performed by the process apparatus are provided. The process apparatus is connected to a database storing a basic insurance group, receives a basic insurance application of an applicant, generates basic policy information of the applicant according to the basic insurance group and the basic insurance application and stores the basic policy information in the database. The process apparatus further calculates a current basic insurance premium of the applicant according to the basic policy information and a current death number corresponding to the basic insurance group. The process apparatus further transmits the current basic insurance premium to the applicant. Thereby, the process and security of the insurance are simplified and improved respectively.

14 Claims, 9 Drawing Sheets

PROCESS APPARATUS AND MUTUAL INSURANCE METHOD PERFORMED BY THE PROCESS APPARATUS

This application claims priority to Taiwan Patent Application Nos. 097107607, 097111255, 097118322, 098105197 filed on Mar. 5, 2008, Mar. 28, 2008, May 19, 2008 and Feb. 19, 2009 respectively.

CROSS-REFERENCES TO RELATED APPLICATIONS

Not applicable.

BACKGROUND OF THE INVENTION

1. Field of the Invention

The present invention relates to a process apparatus and a mutual insurance method performed by the process apparatus. More particularly, the present invention relates to a process apparatus capable of simplifying the insurance process and a mutual insurance method performed by the process apparatus.

2. Descriptions of the Related Art

In the modern society, insurance has become a kind of economical systems of social security in free-economy countries. By paying a certain amount of insurance premium at regular intervals, people can get claim payment of insurance when they have any accidents so that they themselves or their families will not face great difficulties in life.

Traditional insurance systems have a problem of insufficient insurance coverage, which makes it impossible to satisfy insurance demands of the general public. Accordingly, the mutual insurance emerges under such circumstances to solve the problem of insufficient insurance coverage. The concept of the mutual insurance is that, applicants having the same insurance demands are collected together as an insurance group, and in case any mutual-aid person of this insurance group suffers from an accident, other mutual-aid persons of this set will pay a certain amount of insurance premium to accomplish the purpose of mutual insurance. However, the conventional mutual insurance has a number of limitations on ages of the applicants and the deferred period. Hence, when the age of an mutual-aid person is out of the age limits or suffers from an accident within the deferred period, the conventional mutual insurance would fail to receive the applicant's insurance application or refund the gross insurance premium amount that the applicant has participated.

The operational process (e.g., the insurance application, insurance verification, collection of the insurance premium, claim payment and etc.) of either the traditional insurance systems or the mutual insurance needs intervention of massive manpower. Such an operation mode with manpower intervention not only increases the operational cost of insurance companies, but also tends to cause various drawbacks. For example, the insurance information might be deliberately disguised by insurance employees, the insurance premium be wangled by the insurance employees or the insurance benefits be embezzled by some malicious persons. This adds to many risks to the insurance which has been originally established with good intention.

Thanks to development of the network technologies, conventional insurance schemes have already performed the front-end operations of the insurance process (e.g., the insurance application) via a network, so as to reduce the intervention of manpower. U.S. Pat. No. 6,260,024 titled "METHOD AND APPARATUS FOR FACILITATING BUYER-DRIVEN PURCHASE ORDERS ON A COMMERCIAL NETWORK SYSTEM" discloses a buyer-driven commerce that is related to the increasingly prevailing captive insurance in the insurance field. All these technologies are new transaction modes that are developed with the increased consumer sovereignty and transaction information symmetry. Unfortunately, technical difficulties in integration with the network technologies still exist for the back-end of the insurance process, i.e., the insurance verification, collection of insurance premium and claim payment.

Accordingly, an urgent need remains in the art for a popular and open insurance platform, which has the network technologies and the insurance process integrated together to make the insurance information completely open and transparent, provide a variety of policies capable of satisfying the applicants' demands and allow users to pay the insurance premium in an electronic way. Thereby, the insurance risks of the applicants and the underwriting risks of the insurance companies can be effectively decreased, and the insurance demands of the applicants can be satisfied.

SUMMARY OF THE INVENTION

One objective of the present invention is to provide a process apparatus and a mutual insurance method performed by the process apparatus. The process apparatus is connected to a database that stores a basic insurance group. The process apparatus is configured to receive a basic insurance application from an applicant, and receive an insurance proposal of the applicant according to the basic insurance group and the basic insurance application. Then, collection/payment of the insurance premium and settlement of insurance claims can all be performed by the process apparatus.

To this end, the process apparatus provided in the present invention comprises a transceiver, a generation module, a verification module and a calculation module. The transceiver is configured to receive a basic insurance application of an applicant. The generation module is configured to generate basic policy information of the applicant according to the basic insurance group and the basic insurance application and store the basic policy information in the database. The verification module is configured to, before the generation module generates the basic policy information, confirm that a number of applicants of the basic insurance group is smaller than a number of mutual-aid persons recorded in the basic insurance group and, after the generation module generates the basic policy information, confirm that the number of applicants of the basic insurance group is equal to the number of mutual-aid persons recorded in the basic insurance group. The applicant is denoted the one in the waiting list entitles to participate the basic insurance group. The calculation module is configured to calculate a current basic insurance premium of the policyholder according to the basic policy information and a current death number corresponding to the basic insurance group. The transceiver is further configured to transmit the current basic insurance premium to the policyholder.

Also to this end, the mutual insurance method provided in the present invention comprises the following steps: (a) enabling the process apparatus to receive a basic insurance application of an applicant; (b) enabling the process apparatus to confirm that a number of applicants of the basic insurance group is smaller than a number of mutual-aid persons recorded in the basic insurance group; (c) enabling the process apparatus to, subsequent to step (b), generate basic policy information of the applicant according to the basic insurance group and the basic insurance application; (d) enabling the process apparatus to store the basic policy information in the database; (e) enabling the process apparatus to, subsequent to step (b), confirm that the number of applicants of the basic insurance group is equal to the number of mutual-aid persons recorded in the basic insurance group; (f) enabling the process apparatus to calculate a current basic insurance premium of the policyholder according to the basic policy information and a current death number corresponding to the basic insurance group; and (g) enabling the process apparatus to notify the policyholder of the current basic insurance premium.

According to the above descriptions, the present invention uses the process apparatus to receive the insurance proposal of the applicant according to the basic insurance group and the basic insurance application. Once the insurance proposal is received, collection/payment of the insurance premium and settlement of insurance claims can all be performed by the process apparatus. Thereby, a popular and open insurance platform is formed to simplify the process and improve security of the insurance. This effectively reduces insurance risks for applicants and underwriting risks for insurance companies, and effectively satisfies insurance needs of the policyholders without rejecting the insurance proposal because of the age of the applicant or other subjective factors, thus overcoming the drawbacks of the prior art.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
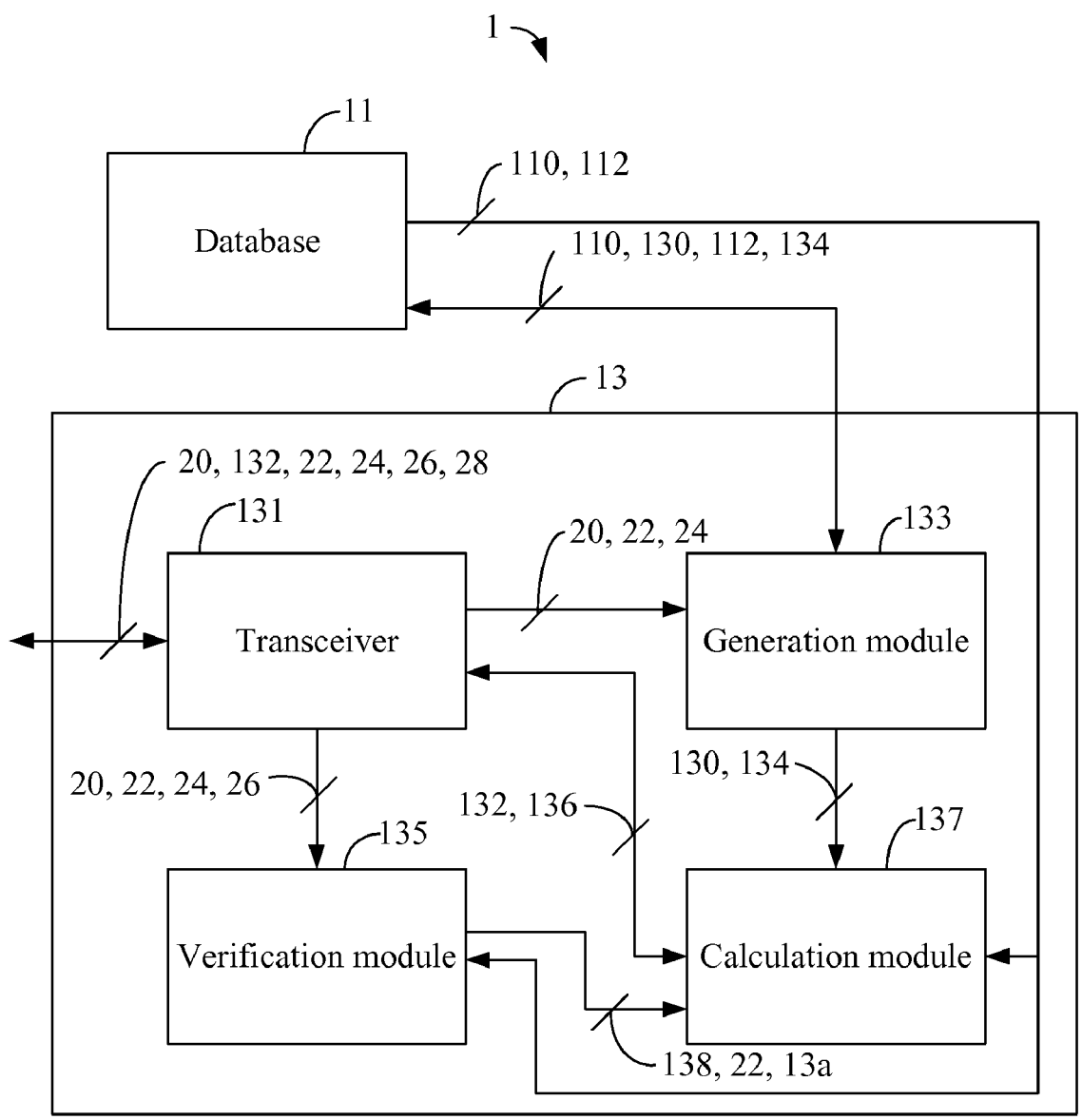
FIG. 1 is a schematic view of a process apparatus of a first embodiment.

A first embodiment of the present invention is depicted in FIG. 1, which is a schematic view of an insurance system 1. The insurance system 1 comprises a database 11 and a process apparatus 13. The process apparatus 13 is connected to the database 11, and the database 11 stores a basic insurance group 110, a plurality of basic policy information corresponding to the basic insurance group 110 respectively, at least one advanced insurance group and a plurality of advanced policy information corresponding to the at least one advanced insurance group respectively. The basic insurance group records a unit insurance premium amount, the number of mutual-aid persons, a deferred period, a compensation amount, a gross insurance premium amount and the like information. Similarly, each of the at least one advanced insurance group also records a unit insurance premium amount, the number of mutual-aid persons, an deferred period, a compensation amount, a gross insurance premium amount and the like information. For specific meanings of the unit insurance premium amount, the number of mutual-aid persons, the deferred period, the compensation amount, the gross insurance premium amount and the like information, descriptions will be made hereinafter. The basic insurance group and the at least one advanced insurance group forms a pyramidal structure.

Figure 2:
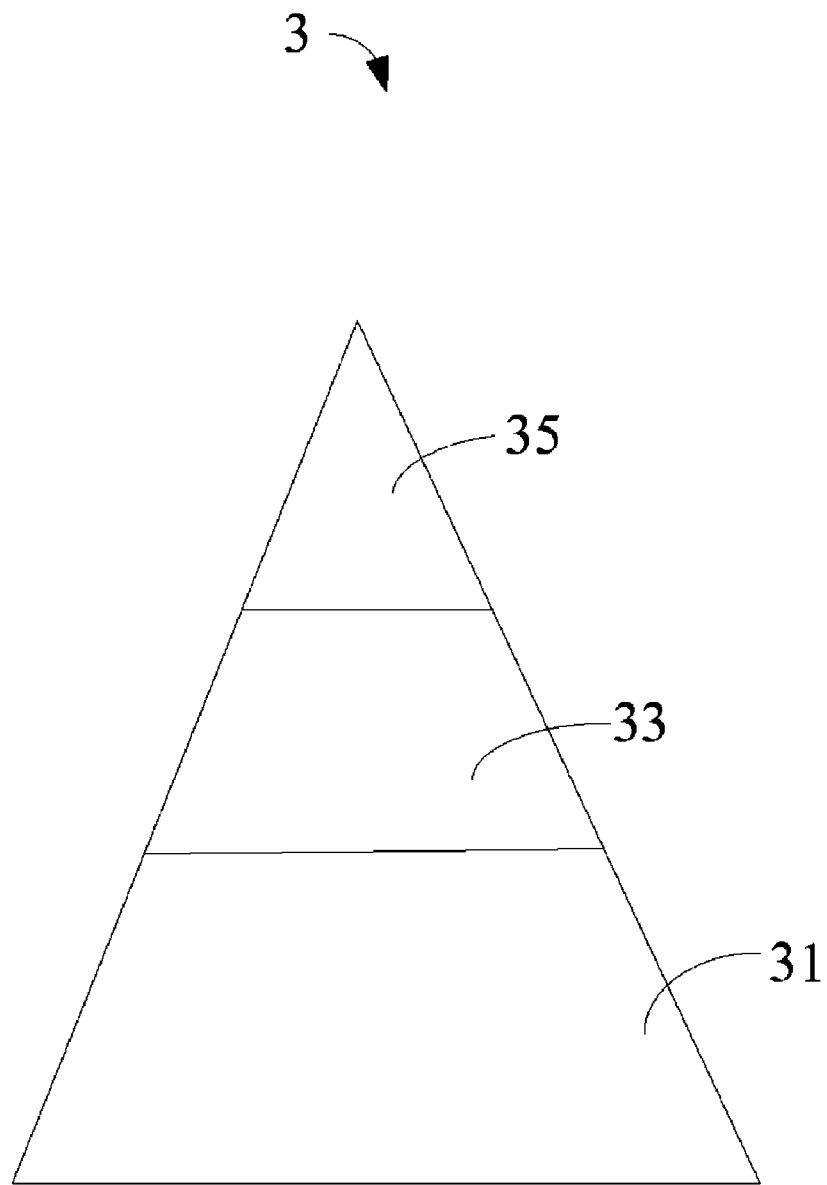
FIG. 2 is a schematic view of a pyramidal structure of the first embodiment.

Referring to FIG. 2, a schematic view of a pyramidal structure 3 of the first embodiment is depicted therein. The pyramidal structure 3 comprises a basic insurance group 31, a first advanced insurance group 33 and a second advanced insurance group 35. In the first embodiment, the number of mutual-aid persons and the unit insurance premium amount of the basic insurance group 31 are 1001 and $300/person respectively; the number of mutual-aid persons and the unit insurance premium amount of the first advanced insurance group 33 are 501 and $4000/person respectively; and the number of mutual-aid persons and the unit insurance premium amount of the second advanced insurance group 35 are 201 and $10000/person respectively. In other words, the basic insurance group 31, the first advanced insurance group 33 and the second advanced insurance group 35 that form the pyramidal structure 3 have the following properties: firstly, the number of mutual-aid persons decreases from the bottom to the top; secondly, the unit insurance premium amount increases from the bottom to the top; and thirdly, an applicant can join in the advanced insurance groups only after he or she has joined in the basic insurance group. Further, rather than being limited to what disclosed in this preferred embodiment, the number of insurances sets included in the pyramidal structure 3, the number of mutual-aid persons in each of the insurance groups and the unit insurance premium amount may also be adjusted depending on practical conditions.

Now, technical features of the present invention will be described with reference to the database 11 which stores the basic insurance group 110 and an advanced insurance group 112. Referring back to FIG. 1, the process apparatus 13 further comprises a transceiver 131, a generation module 133, a verification module 135 and a calculation module 137. In this embodiment, the process apparatus 13 may be a server; the transceiver 131 may be an input/output interface for the server; and the generation module 133, the verification module 135 and the calculation module 137 may be implemented by a processor of the server or other modules having a computation capability. In other embodiments, the process apparatus 13 may be other apparatuses having functions similar to a server.

The transceiver 131 is configured to receive a basic insurance application 20 from an applicant. The basic insurance application 20 comprises at least a name of the applicant, a name of an mutual-aid person, a name of a beneficiary and the like information. After receiving the basic insurance application 20 from the applicant, the verification module 135 determines whether the number of applicants of the basic insurance group 110 is smaller than the number of mutual-aid persons recorded in the basic insurance group 110. If the number of applicants of the basic insurance group 110 is not smaller than the number of mutual-aid persons recorded in the basic insurance group 110, the verification module 135 rejects the basic insurance application of the applicant. For example, the number of mutual-aid persons recorded in the basic insurance group 110 is 1001, so if the number of applicants has already reached 1001, the verification module 135 will reject the basic insurance application 20 of the applicant. On the other hand, if the number of applicants of the basic insurance group 110 is smaller than the number of mutual-aid persons recorded in the basic insurance group 110, the basic insurance application 20 of the applicant will be received. As an example, if now the number of applicants is 900, then the verification module 135 will increment the number of applicants to 901 and receive the basic insurance application 20 of the applicant.

The further description will be made with reference to the case where the original number of applicants is 900, the verification module 135 increments the number of applicants to 901 and receives the basic insurance application 20 of the applicant. After receiving the basic insurance application 20 of the applicant, the generation module 133 generates basic policy information 130 of the applicant according to the basic insurance group 110 and the basic insurance application 20, and stores the basic policy information 130 in the database 11. The basic policy information 130 records the name of the applicant, the name of the mutual-aid person and the name of the beneficiary. It can be seen that, the basic policy information stored in the database 11 is records on different applicants joining in the basic insurance group 110.

After receiving the basic insurance application 20 of the applicant, the number of applicants now becomes 901 which is smaller than the number of mutual-aid persons in the basic insurance group 110 (i.e., 1001), so the basic insurance group 110 has not been activated. Hence, the transceiver 131 of the process apparatus 13 may continue to receive basic insurance applications of other applicants, and, after receiving the basic insurance applications of other applicants, the verification module 135 determines whether the current number of applicants is smaller than the number of mutual-aid persons. If the number of applicants is still smaller than the number of mutual-aid persons, the generation module 133 generates basic policy information of the other applicants according to the basic insurance group 110 and the basic insurance applications of the other applicants, and stores it in the database 11.

Upon confirming that the number of applicants of the basic insurance group 110 is equal to the number of mutual-aid persons (i.e., 1001) recorded in the basic insurance group 110, the verification module 135 activates the basic insurance group 110 and transmits an enable signal 138 to the calculation module 137. At this point, after receiving the enable signal 138, the calculation module 137 calculates, for each insurance term, a current basic insurance premium 132 of each applicant in the basic insurance group 110 according to the basic policy information 130 and a current death number corresponding to the basic insurance group 110. Then, the transceiver 131 transmits each of the current basic insurance premium 132 to respective applicants so that each of the applicants is informed of the amount he or she should receive or pay. It should be noted that, if no mutual-aid person is dead in the current insurance term, it is unnecessary for the applicants to pay any insurance premium.

In more detail, before the calculation module 137 calculates the current basic insurance premium 132 in each insurance term, the transceiver 131 receives at least one death information 22 during a time period (e.g., the last day of each month). Each of the at least one death information 22 records a name (or ID) of a dead person. In particular, Each of the at least one death information 22 is transmitted by the respective applicant in the basic insurance group 110 to the transceiver 131 of the process apparatus 13. Afterwards, the verification module 135 confirms whether the name of the dead person recorded in the death information 22 is consistent with one of the names (or IDs) of the mutual-aid persons in the basic insurance information stored in the database 11. If they are consistent with each other, the verification module 135 transmits the at least one death information 22 to the calculation module 137, which then calculates the number of the death information as the current death number. For example, if the transceiver 131 receives only a single death information, the calculation module 137 will derive through counting that the current death number is one; if the transceiver 131 receives two death information, the calculation module 137 will derive through counting that the current death number is two; and so on.

Next, for each applicant in the basic insurance group 110 and before the calculation module 137 calculates the current basic insurance premium 132, the verification module 135 confirms whether the name of the mutual-aid person in the basic policy information 130 corresponding to the applicant is the same as one of the names of the dead persons recorded in the at least one death information 22. If the name of the mutual-aid person in the basic policy information 130 corresponding to a certain applicant is inconsistent with any of the names of the dead persons recorded in the at least one death information 22, it means that the mutual-aid person recorded in the basic policy information 130 corresponding to the applicant is not dead, and then the calculation module 137 multiplies the unit insurance premium amount with the current death number as the current basic insurance premium. Here, the current basic insurance premium is a fee that the applicant shall pay. As an example, assuming that the current death number is 5 and the unit insurance premium amount is $300/person, then the applicants whose mutual-aid persons are not dead shall pay a current basic insurance premium of $1500 ($300/person×5 persons). This current basic insurance premium (i.e., $1500) is just the fee that the applicants whose mutual-aid persons are not dead shall pay.

If, as confirmed by the verification module 135, the name of the mutual-aid person in the basic policy information 130 corresponding to a certain applicant is consistent with one of the names of the dead persons recorded in the at least one death information 22, it means that the mutual-aid person recorded in the basic policy information 130 corresponding to the applicant has been dead. In this case, the verification module 135 needs to further confirm whether the number of terms that the applicant has participated for the insurance is shorter than an deferred period of the basic insurance group 110. If the paid term number of the applicant is shorter than the deferred period, the calculation module 137 calculates a sum of an insurance premium amount that the applicant has participated and a compensation amount recorded in the basic insurance group 110 as a claim payment amount that the beneficiary recorded in the basic policy information 130 of the applicant shall receive. As an example, assume that the deferred period recorded in the basic insurance group 110 is two years (i.e., 24 terms), the compensation amount is $10000, the insurance premium amount that the applicant has participated is $3900 and the paid term number that the applicant has participated is 12 terms. Then if the mutual-aid person recorded in the basic insurance information 130 corresponding to the applicant is dead during the 13$^{th}$ term, which means that the number of terms that the applicant has participated for the insurance is shorter than the deferred period of the basic insurance group 110, then the calculation module 13 will adds the compensate amount of $10000 to the paid insurance premium amount of $3900 as a claim payment amount (i.e., $13900) that the beneficiary recorded in the basic policy information corresponding to the applicant shall receive.

If, as confirmed by the verification module 135, the name of the mutual-aid person in the basic policy information 130 corresponding to the applicant is consistent with one of the names of the dead persons recorded in the at least one death information 22 and that the paid term number of the applicant is longer than the deferred period recorded in the basic insurance information 110, the calculation module 137 sets the gross insurance premium amount of the basic insurance information 110 as a claim payment amount that the beneficiary recorded in the basic policy information 130 of the applicant shall receive. As an example, assume that the gross insurance premium amount and the deferred period recorded in the basic insurance group 110 are #300000 and two years (i.e., 24 terms) respectively. Then if the mutual-aid person recorded in the basic insurance information 130 corresponding to the applicant is dead during the 25$^{th}$ term, the claim payment amount that the beneficiary recorded in the basic policy information 130 corresponding to the applicant shall receive is $300000.

Next, the advanced insurance group 112 will be described in detail. The applicants who have joined in the basic insurance group 110 may further apply to join in the advanced insurance group 112. Accordingly, the transceiver 131 is further configured to receive an advanced insurance application 24 from an applicant. The advanced insurance application 24 records at least the name of the applicant, the name of the mutual-aid person, the name of the beneficiary and the like information. After receiving the advanced insurance application 24 from the applicant, the verification module 135 determines whether the number of applicants of the advanced insurance group 112 is smaller than the number of mutual-aid persons recorded in the advanced insurance group 112. If the number of applicants of the advanced insurance group 112 is no smaller than the number of mutual-aid persons recorded in the advanced insurance group 112, the verification module 135 rejects the advanced insurance application of the applicant. For example, assuming that the number of mutual-aid persons recorded in the advanced insurance group 112 is 501 and the number of applicants has reached 501, the verification module 135 will rejects the advanced insurance application 24 of the applicant. On the other hand, if the number of applicants of the advanced insurance group 112 is smaller than the number of mutual-aid persons recorded in the advanced insurance group 112, the advanced insurance application 24 of the applicant will be received. As an example, assuming that the number of mutual-aid persons recorded in the advanced insurance group 112 is 501 and the number of applicants is 400, then the verification module 135 will increment the number of applicants to 401 and receive the advanced insurance application 24 of the applicant.

Hereinbelow, a further description will be made with reference to the case where the original number of applicants of the advanced insurance group 112 is 400, the verification module 135 increments the number of applicants to 401 and receives the advanced insurance application 24 of the applicant. After the process apparatus 13 has received the advanced insurance application 24 of the applicant, the generation module 133 generates advanced policy information 134 of the applicant according to the advanced insurance group 112 and the advanced insurance application 24, and stores the advanced policy information 134 in the database 11. The advanced policy information 134 records the name of the applicant, the name of the mutual-aid person and the name of the beneficiary. It can be seen that, the advanced policy information 134 stored in the database 11 is records on different applicants joining in the advanced insurance group 112. It should be emphasized that, the applicants who join in the advanced insurance group 112 must have joined in the basic insurance group 110.

Since, after the process apparatus 13 receives the advanced insurance application 24 of the applicant, the number of applicants has not reached the number of mutual-aid persons (i.e., 501) in the advanced insurance group 112, the advanced insurance group 112 is not activated. Hence, the transceiver 131 of the process apparatus 13 may continue to receive advanced insurance applications of other applicants, and, after receiving the advanced insurance applications of other applicants, the verification module 135 determines whether the current number of applicants of the advanced insurance group 112 is smaller than the number of mutual-aid persons recorded in the advanced insurance group 112. If the number of applicants of the advanced insurance group 112 is still smaller than the number of mutual-aid persons recorded in the advanced insurance group 112, the generation module 133 generates advanced policy information of the other applicants according to the advanced insurance group 112 and the advanced insurance applications of the other applicants, and stores it in the database 11.

Upon confirming that the number of applicants of the advanced insurance group 112 is equal to the number of mutual-aid persons (i.e., 501) recorded in the advanced insurance group 112, the verification module 135 activates the advanced insurance group 112 and transmits an enable signal 13a to the calculation module 137. At this point, after receiving the enable signal 13a, the calculation module 137 calculates, for each insurance term, a current advanced insurance premium 136 of each applicant in the advanced insurance group 112 according to the advanced policy information 134 and a current death number corresponding to the advanced insurance group 112. Then, the transceiver 131 transmits each of the current advanced insurance premiums 136 to respective applicants so that each of the policyholders is informed of the amount he or she should receive or pay.

As has already been described in connection with the basic insurance group 110, the transceiver 131 receives at least one death information 22 during each term. The death information 22 records a name (or ID) of a dead person. The verification module 135 confirms whether the name (or the ID of the mutual-aid person) of the dead person recorded in the at least one death information 22 is consistent with one of the names (or IDs) of the mutual-aid persons in the advanced insurance information stored in the database 11. If they are consistent with each other, the verification module 135 transmits the at least one death information 22 to the calculation module 137, which then calculates the number of the death information as the current death number corresponding to the advanced insurance group 112. For example, if one of the at least one death information 22 received by the transceiver 131 records a name of a dead person that is consistent with one of the names of the mutual-aid persons recorded in the advanced insurance information, the calculation module 137 will derive through counting that the current death number of the advanced insurance group 112 is one; and so on.

Next, for each applicant in the advanced insurance group 112 and before the calculation module 137 calculates the current advanced insurance premium 136, the verification module 135 confirms whether the name of the mutual-aid person in the advanced policy information 134 corresponding to the applicant is consistent with one of the names of the dead persons recorded in the at least one death information 22. If the name of the mutual-aid person in the advanced policy information 134 corresponding to a certain applicant is inconsistent with any of the names of the dead persons recorded in the at least one death information 22, it means that the mutual-aid person recorded in the advanced policy information 134 corresponding to the applicant is not dead, and then the calculation module 137 multiplies the unit insurance premium amount recorded in the advanced insurance group 112 with the current death number in the advanced insurance group 112 as the current advanced insurance premium of the policyholder. Here, the current advanced insurance premium is a fee that the policyholder shall pay. As an example, assuming that the current death number in the current advanced insurance group 112 is 5 and the unit insurance premium amount recorded in the advanced insurance group 112 is $4000/person, then the policyholders whose mutual-aid persons are not dead shall pay a current advanced insurance premium of $20000 ($4000/person×5 persons). This current advanced insurance premium (i.e., $20000) is just the fee that the policyholders whose mutual-aid persons are not dead shall pay.

If, as confirmed by the verification module 135, the name of the mutual-aid person in the advanced policy information 134 corresponding to a certain applicant is consistent with one of the names of the dead persons recorded in the at least one death information 22, it means that the mutual-aid person recorded in the advanced policy information 134 corresponding to the applicant has been dead. In this case, the verification module 135 needs to further confirm whether the number of terms that have been paid by the applicant for the advanced insurance group 112 is shorter than an deferred period recorded in the advanced insurance group 112. If the paid term number paid by the applicant for the advanced insurance group 112 is shorter than the deferred period recorded in the advanced insurance group 112, the calculation module 137 calculates a sum of an advanced insurance premium amount that the applicant has participated and a compensation amount recorded in the advanced insurance group 112 as a current advanced insurance premium that the beneficiary recorded in the advanced policy information 134 of the policyholder shall receive. As an example, assume that the deferred period recorded in the advanced insurance group 112 is two years (i.e., 24 terms), the compensation amount is $100000, the advanced insurance premium amount that the policyholder has participated is $48000 and the paid term number that the applicant has participated for the advanced insurance group 112 is 12 terms. Then if the mutual-aid person recorded in the advanced insurance information 134 corresponding to the applicant is dead during the $13^{th}$ term, which means that the number of terms that the applicant has participated is shorter than the deferred period recorded in the advanced insurance group 112, then the calculation module 13 will adds the compensate amount of $100000 to the paid advanced insurance premium amount of $48000 as a claim payment amount that the beneficiary recorded in the advanced policy information 134 corresponding to the policyholder shall receive.

If, as confirmed by the verification module 135, the name of the mutual-aid person in the advanced policy information 134 corresponding to the applicant is consistent with one of the names of the dead persons recorded in the at least one death information 22 and that the paid term number paid by the applicant for the advanced insurance group 112 is longer than the deferred period recorded in the advanced insurance group 112, the calculation module 137 sets the current advanced insurance premium as the gross insurance premium amount recorded in the advanced insurance group 112. Here, the current advanced insurance premium is the claim payment amount that the beneficiary recorded in the advanced policy information 134 corresponding to the policyholder shall receive. As an example, assume that the gross insurance premium amount and the deferred period recorded in the advanced insurance group 112 are $2000000 and two years (i.e., 24 terms) respectively. Then if the mutual-aid person recorded in the advanced insurance information 134 corresponding to the applicant is dead during the $25^{th}$ term, the claim payment amount that the beneficiary recorded in the advanced policy information 134 corresponding to the policyholder shall receive is $2000000.

Further speaking, the process apparatus 1 also provides a transaction function so that both the basic policy information and the advanced policy information of the applicant can be transacted. In particular, the transceiver 131 is further configured to receive a policy transaction application 26 of the policyholder, in which the policy transaction application 26 indicates that the policyholder desires to transact the basic policy information 130 and/or the advanced policy information 134. Afterwards, the transceiver 131 receives at least one bidding price. The verification module 135 chooses the highest one of the bidding prices 28, and sets a bidder of the highest bidding price as a bid winner. The verification module 135 further sets the applicant recorded in the basic policy information 130 and/or the advanced policy information 134 as the bid winner.

To clarify the features of the present invention more clearly, an example will be described hereinafter. In this example, the basic insurance group 110 stored in the database 11 records that the number of mutual-aid persons is 1,001, there is one term per month, the gross insurance premium amount is $300,000, the unit insurance premium amount is $300/person, and the insurance premium is paid in a post-event payment approach. Further speaking, the basic insurance group 110 records that, if the mutual-aid person recorded in the basic insurance information of the applicant is not dead, the current basic insurance premium the policyholder shall pay for each term (monthly) shall be the unit insurance premium amount× the current death number. The deferred period, the compensation amount and the number of current applicants recorded in the basic insurance group 110 are two years (24 terms), $10,000 and 1000 persons respectively.

Furthermore, the advanced insurance group 112 stored in the database 11 records that the number of mutual-aid persons is 501, there is one term per month, the gross insurance premium amount is $2,000,000, the unit insurance premium amount is $4000/person, and the insurance premium is paid in a post-event payment approach. The advanced insurance group 112 records that, if the mutual-aid person recorded in the advanced insurance information of the applicant is not dead, the current advanced insurance premium the policyholder shall pay for each term (monthly) shall be the unit insurance premium amount×the current death number. The deferred period, the compensation amount and the number of current applicants recorded in the advanced insurance group 112 are two years (24 terms), $100,000 and 500 persons respectively.

If an policyholder (e.g., Xiao Ming) desires to apply for a mutual insurance for his elderly father (the mutual-aid person), Xiao Ming proposes a basic insurance application 20 to the process apparatus 1 via the network. After receiving and receiving the basic insurance application 20, the process apparatus 1 generates basic policy information of the applicant (e.g., Xiao Ming). Since the number of applicants in the basic insurance group 110 reaches 1001 after joining in of the applicant (e.g., Xiao Ming), the process apparatus 1 activates the basic insurance group 110 so that the mutual-aid persons can enjoy the security provided by the basic insurance group 110.

Assuming that three mutual-aid persons (exclusive of Xiao Ming's father) of the basic insurance group 110 die in the $1^{st}$ term, then the current basic insurance premium that Xiao Ming shall pay for the $1^{st}$ term is $900 ($900/person×3 persons). Also assume that the current basic insurance premiums Xiao Ming pays next for the $2^{nd}$ and the $3^{rd}$ terms are $1200 and $300 respectively, and Xiao Ming's father dies after the $3^{rd}$ term. Since the paid term number (three terms) that Xiao Ming has paid for the basic insurance group 110 is shorter than the deferred period (24 terms) of the basic insurance group 110, the beneficiary recorded in the basic policy information corresponding to Xiao Ming shall receive the insurance premium amount Xiao Ming has paid plus the compensation amount as a claim payment amount, that is $12,400 (i.e., $900+$1200+$300+$10,000).

If Xiao Ming's father dies after Xiao Ming has paid for 30 terms, then as the paid term number (30 terms) that Xiao Ming has paid is longer than the deferred period (24 terms), the beneficiary recorded in the basic policy information corresponding to Xiao Ming shall receive the gross insurance premium amount recorded in the basic insurance group 110 as a claim payment amount, that is, the beneficiary shall receive $300,000.

If after having joined in the basic insurance group 110, Xiao Ming still thinks that the backup is not sufficient, he may propose an advanced insurance application 24 to the process apparatus 1 via the network for his father to join in the advanced insurance group additionally. After receiving and receiving the advanced insurance application, the process apparatus 1 generates advanced policy information of the applicant (e.g., Xiao Ming). Since the number of applicants in the advanced insurance group 112 reaches 501 after joining in of the applicant (i.e., Xiao Ming), the process apparatus 1 activates the advanced insurance group 112 so that the mutual-aid persons can further enjoy the security provided by the advanced insurance group 112.

Assuming that three mutual-aid persons (exclusive of Xiao Ming's father) of the advanced insurance group 112 die in the $1^{st}$ term, then the current advanced insurance premium that Xiao Ming shall pay for the $1^{st}$ term is $12,000 ($4000/person×3 persons). Plus the aforesaid current basic insurance premium, the total current insurance premium Xiao Ming shall pay is $12,900. If Xiao Ming's father dies after the $3^{rd}$ term, then as the paid term number (three terms) that Xiao Ming has paid for the advanced insurance group 112 is shorter than the deferred period (24 terms) of the advanced insurance group 112, the beneficiary recorded in the advanced policy information corresponding to Xiao Ming shall receive the advanced insurance premium amount Xiao Ming has paid plus the compensation amount recorded in the advanced insurance group 112 as a claim payment amount. Assuming that the current advanced insurance premiums Xiao Ming has paid for the first three terms are $12,000, $16,000 and $4,000 respectively, then the beneficiary recorded in the advanced policy corresponding to Xiao Ming shall receive $132,000 (i.e., $1,2000+$16,000+$4,000+$100,000).

If Xiao Ming's father dies after Xiao Ming has paid for 30 terms of the advanced insurance group 112, then as the paid term number that Xiao Ming has paid for the advanced insurance group 112 is longer than the deferred period recorded in the advanced insurance group 112, the beneficiary recorded in the advanced policy information corresponding to Xiao Ming shall receive the gross insurance premium amount recorded in the advanced insurance group 112 as a claim payment amount, that is, the beneficiary shall receive $2,000,000.

If Xiao Ming's father is sick in hospital and needs a large sum of money for medical treatment, Xiao Ming May further propose a policy transaction application through the network to raise money. Assume that now Xiao Ming applies to transact the policy of the advanced insurance group, the process apparatus 1, after receiving the policy transaction application from Xiao Ming, will publish the policy of the advanced insurance group that Xiao Ming wants to transact. Afterwards, the process apparatus 1 can receive bidding prices offered by bidders. Assuming that Xiao Chen, Xiao Wang and Xiao Li offer a bidding price of $1,000,000, $1,900,000 and $1,500,000 respectively, the process apparatus 1 will choose the bidding price offered by Xiao Wang as the highest bidding price and sets Xiao Wang as the bid winner. Then, after receiving the amount of $1,900,000 from Xiao Wang, the process apparatus 1 changes the name of the policyholder of the advanced policy information originally owned by Xiao Ming into Xiao Wang, thereby completing the whole transaction procedure.

A second embodiment of the present invention is shown in FIGS. 3A to 3G, which depict a flowchart of a mutual insurance method performed by the process apparatus described in the first embodiment. The process apparatus is connected to a database. The database stores a basic insurance group, at least one advanced insurance group, a plurality of basic policy information corresponding to the basic insurance group and a plurality of advanced policy information corresponding to the at least one advanced insurance group.

Figure 3A:
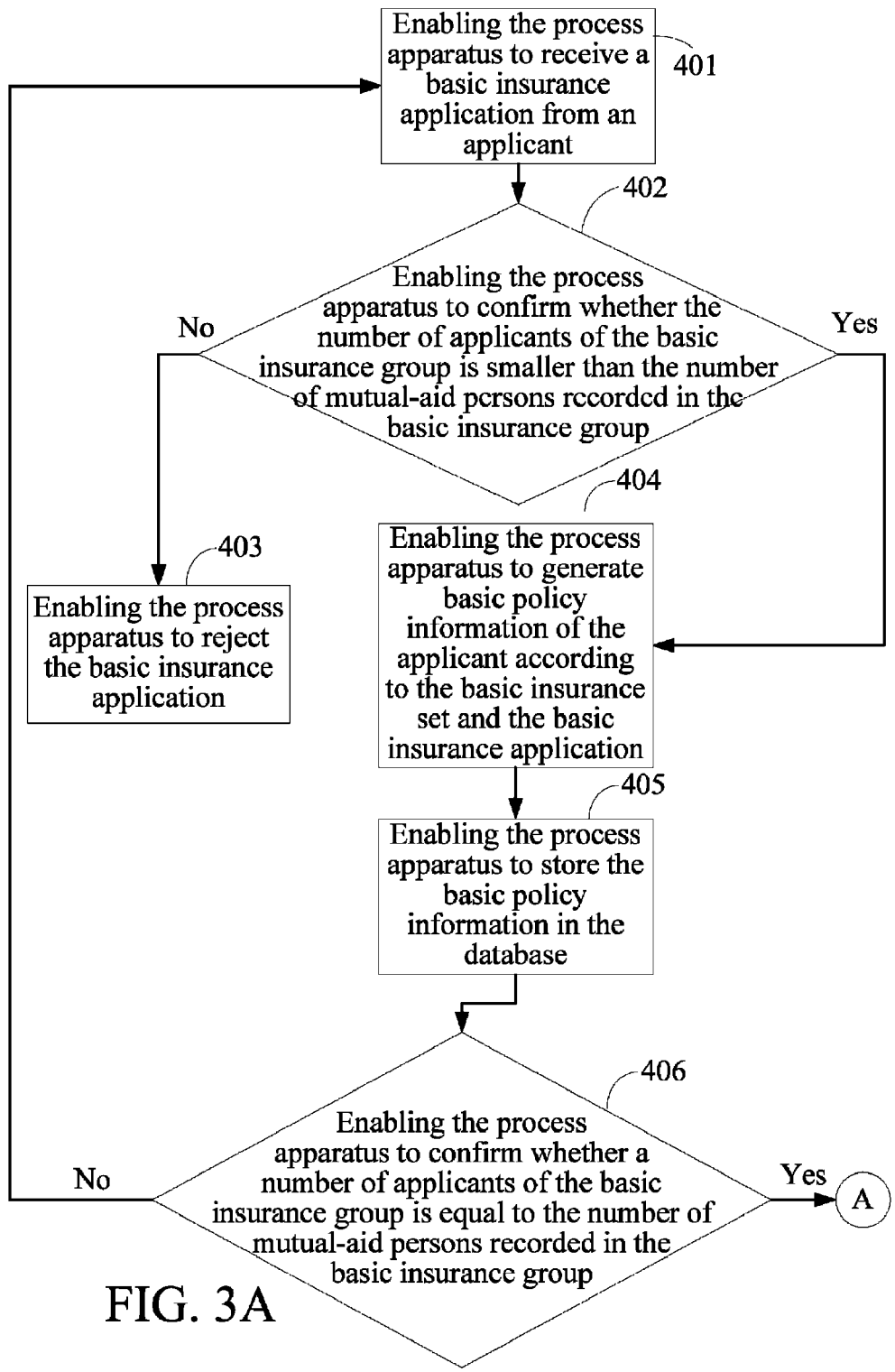
FIG. 3A is a first portion of a flowchart of a second embodiment.

Referring to FIG. 3A at first, in the second embodiment, Step 401 is initially executed to enable the process apparatus to receive a basic insurance application from an applicant. Then, Step 402 is executed to enable the process apparatus to confirm whether the number of applicants of the basic insurance group is smaller than the number of mutual-aid persons recorded in the basic insurance group. If the answer in Step 402 is no, Step 403 is executed to enable the process apparatus to reject the basic insurance application of the applicant. Otherwise, if the answer in Step 402 is yes, Step 404 is executed to enable the process apparatus to generate basic policy information of the applicant according to the basic insurance group and the basic insurance application. Thereafter, Step 405 is executed to enable the process apparatus to store the basic policy information in the database.

Figure 3B:
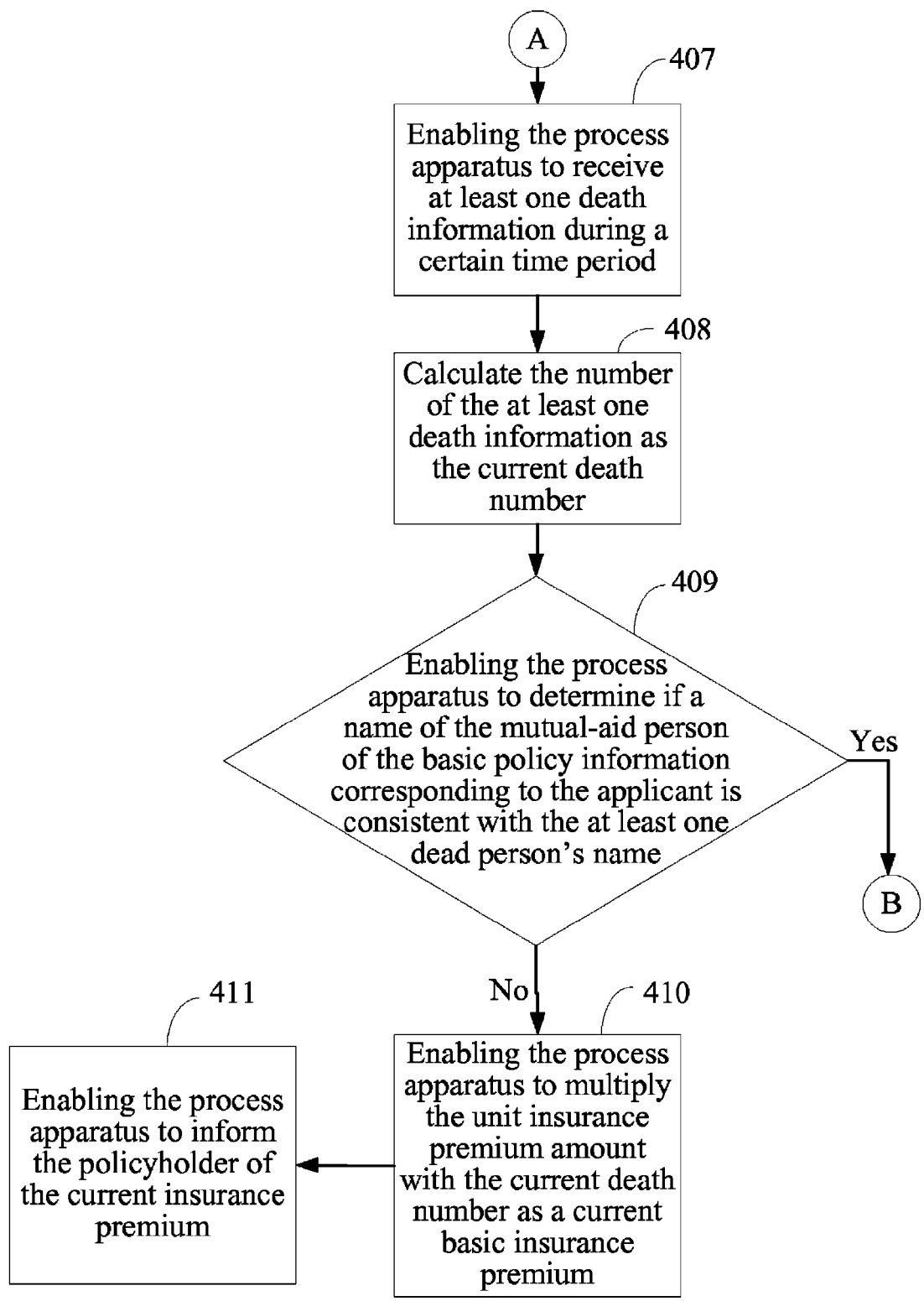
FIG. 3B is a second portion of the flowchart of the second embodiment.

Subsequently, Step 406 is executed to enable the process apparatus to confirm whether a number of applicants of the basic insurance group is equal to the number of mutual-aid persons recorded in the basic insurance group. If the answer in Step 406 is no, the second embodiment returns to Step 401 to continue to receive basic insurance applications from other applicants. Referring to FIG. 3B, if the answer in Step 406 is yes, Step 407 is executed to enable the process apparatus to receive at least one death information during a certain time period. Each of the at least one death information records a name of a dead person, and each of the names of the dead persons is consistent with one of the mutual-aid persons recorded in the basic policy information stored in the database.

Afterwards, Step 408 is executed to enable the process apparatus to calculate the number of the at least one death information as a current death number. Step 409 is executed to enable the process apparatus to determine if a name of the mutual-aid person of the basic policy information corresponding to the applicant is consistent with the at least one dead person's name. If not, Step 410 is executed to enable the process apparatus to multiply the unit insurance premium amount with the current death number as a current basic insurance premium that the policyholder shall pay. Then, Step 411 is executed to enable the process apparatus to inform the policyholder of the current insurance premium.

Figure 3C:
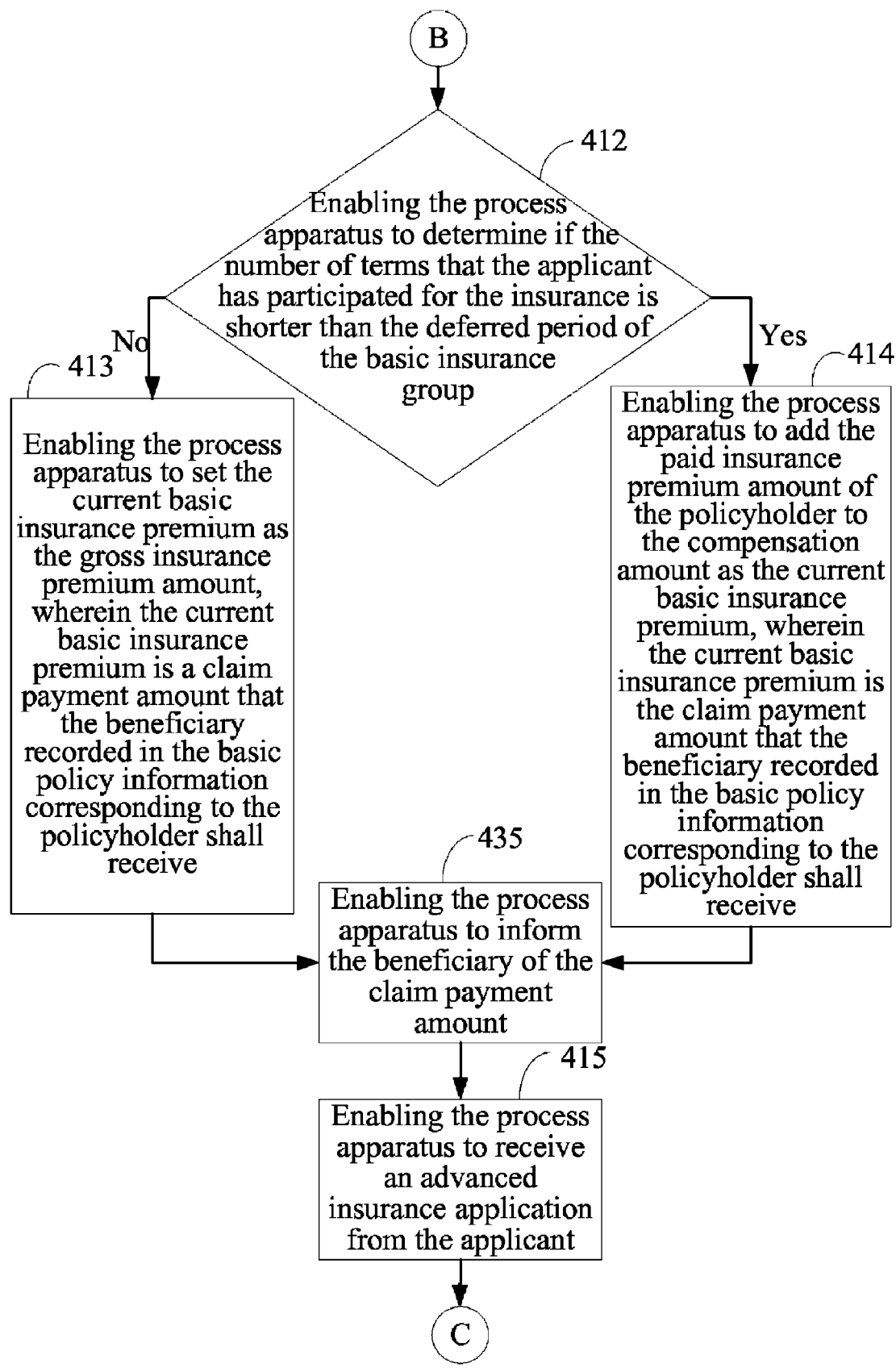
FIG. 3C is a third portion of the flowchart of the second embodiment.

Referring to FIG. 3C, if the answer in Step 409 is yes, i.e., the process apparatus determines that the name of the mutual-aid person of the basic policy information corresponding to the applicant is consistent with the at least one dead person's name, Step 412 is executed to enable the process apparatus to determine if the number of terms that the applicant has participated for the insurance is shorter than an deferred period of the basic insurance group. If the answer in Step 412 is no (i.e., the paid term number is equal to or longer than the deferred period), Step 413 is executed to enable the process apparatus to set the gross insurance premium amount as a claim payment amount that the beneficiary recorded in the basic policy information corresponding to the policyholder shall receive. Next, Step 435 is executed to enable the process apparatus to inform the beneficiary of the claim payment amount. On the other hand, if in Step 412, the process apparatus determines that the paid term number of the applicant is shorter than the deferred period recorded in the basic insurance group, Step 414 is executed to enable the process apparatus to add the paid insurance premium amount of the policyholder to the compensation amount as the claim payment amount that the beneficiary recorded in the basic policy information corresponding to the policyholder shall receive. Then, Step 435 is executed to enable the process apparatus to inform the beneficiary of the claim payment amount.

Figure 3D:
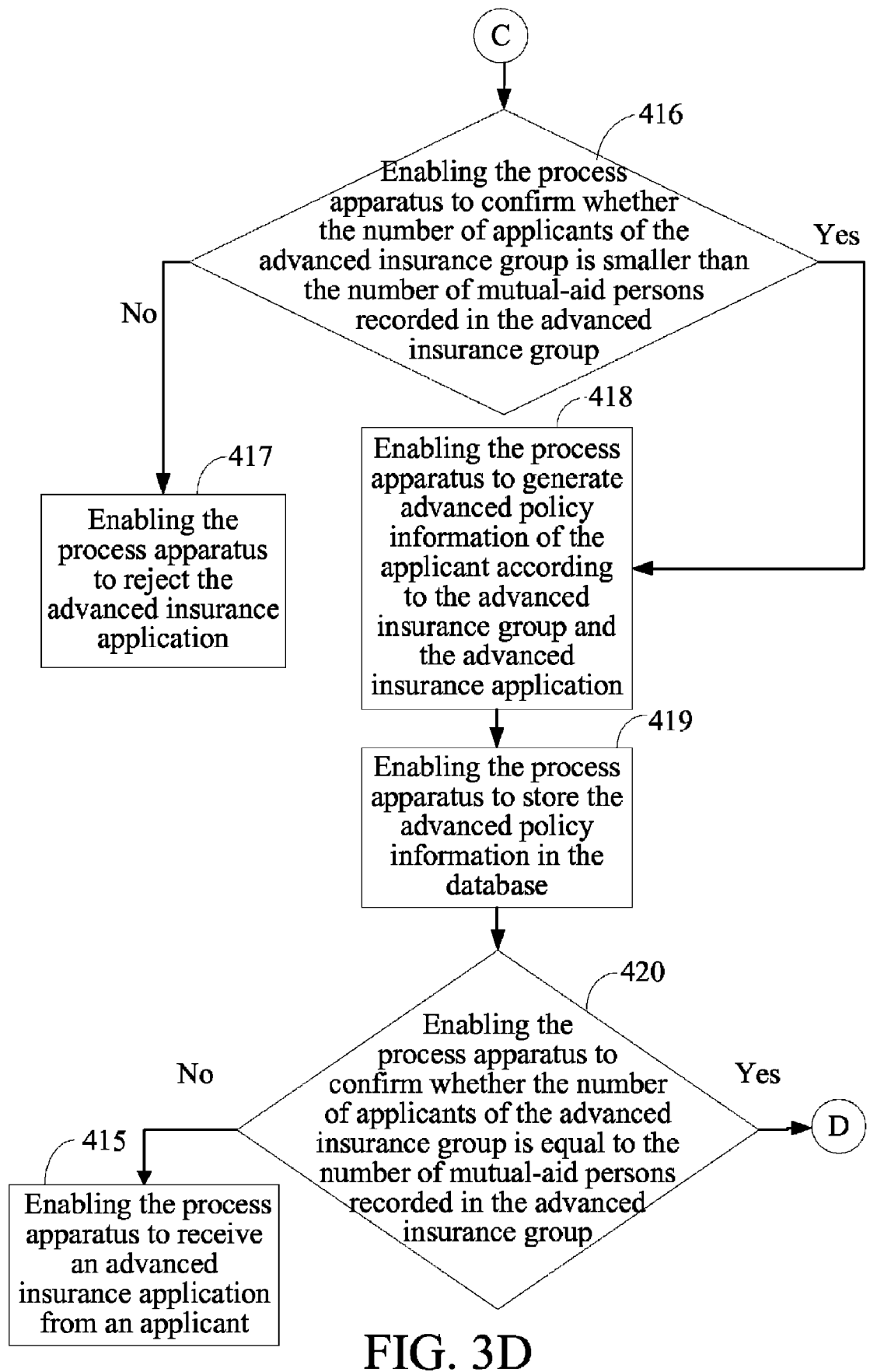
FIG. 3D is a fourth portion of the flowchart of the second embodiment.
Figure 3E:
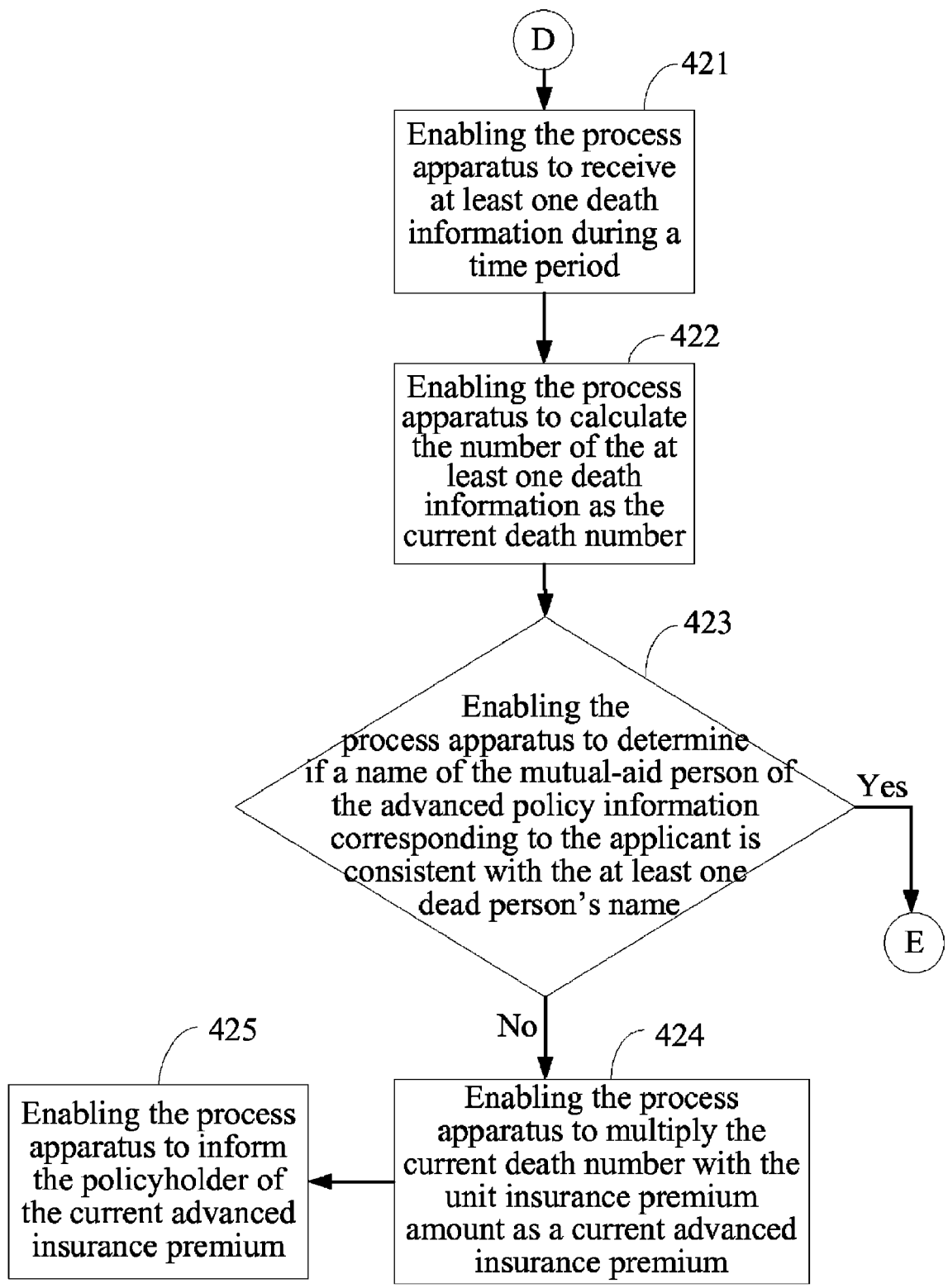
FIG. 3E is a fifth portion of the flowchart of the second embodiment.

Next, Step 415 is executed to enable the process apparatus to receive an advanced insurance application from the applicant. Refer next to FIG. 3D. Then, Step 416 is executed in the second embodiment to enable the process apparatus to confirm whether the number of applicants of the advanced insurance group is smaller than the number of mutual-aid persons recorded in the advanced insurance group. If the answer in Step 416 is no, Step 417 is executed to enable the process apparatus to reject the advanced insurance application of the applicant. Otherwise, if the answer in Step 416 is yes, Step 418 is executed to enable the process apparatus to generate advanced policy information of the applicant according to the advanced insurance group and the advanced insurance application. Thereafter, Step 419 is executed to enable the process apparatus to store the advanced policy information in the database. It should be emphasized that, in other examples, Steps 415 through 419 may be executed at any time subsequent to Step 404.

Subsequently, Step 420 is executed to enable the process apparatus to confirm whether the number of applicants of the advanced insurance group is equal to the number of mutual-aid persons recorded in the advanced insurance group. If the answer in Step 420 is no, Step 415 is executed to continue to receive advanced insurance applications from other applicants. Otherwise, if the answer in Step 420 is yes, please refer to subsequent steps depicted in FIG. 3E. Step 421 is executed to enable the process apparatus to receive at least one death information during a certain time period. Each of the at least one death information records a name of a dead person, and each of the names of the dead persons is consistent with one of the mutual-aid persons recorded in the advanced policy information stored in the database.

Afterwards, Step 422 is executed to enable the process apparatus to calculate the number of the at least one death information as a current death number of the advanced insurance group. Step 423 is executed to enable the process apparatus to determine if a name of the mutual-aid person of the advanced policy information corresponding to the applicant is consistent with the at least one dead person's name. If not, Step 424 is executed to enable the process apparatus to multiply the unit insurance premium amount of the advanced insurance group with the current death number of the advanced insurance group as a current advanced insurance premium that the policyholder shall pay. Then, Step 425 is executed to enable the process apparatus to inform the policyholder of the current advanced insurance premium.

Figure 3F:
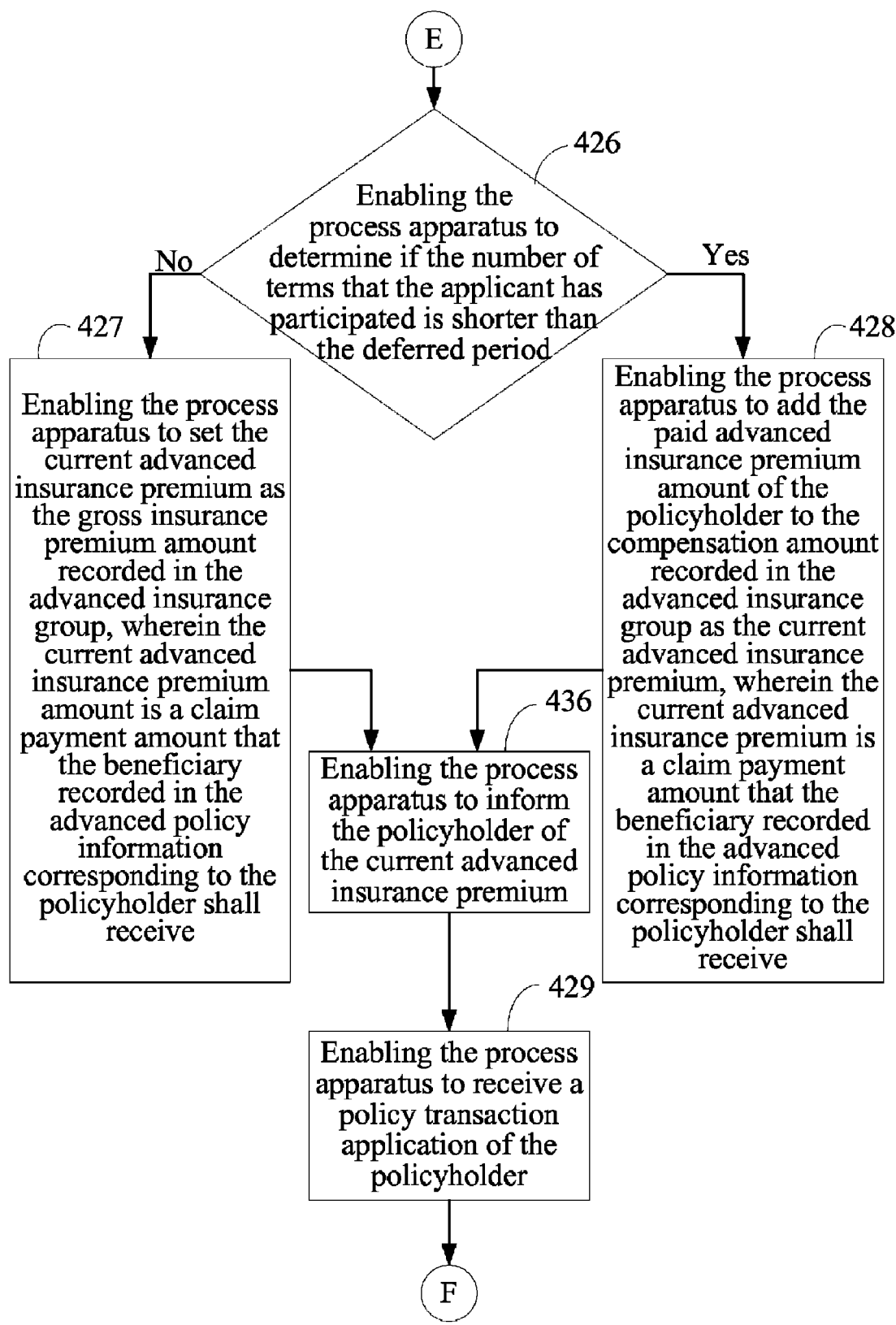
FIG. 3F is a sixth portion of the flowchart of the second embodiment.

If, in Step 423, the process apparatus determines that the name of the mutual-aid person of the advanced policy information corresponding to the applicant is consistent with the at least one dead person's name, please refer to subsequent steps depicted in FIG. 3F. Step 426 is executed to enable the process apparatus to determine if the number of terms that the applicant has participated for the advanced insurance group is shorter than an deferred period of the advanced insurance group. If the answer in Step 426 is no (i.e., the paid term number is equal to or longer than the deferred period), Step 427 is executed to enable the process apparatus to set the gross insurance premium amount of the advanced insurance group as a claim payment amount that the beneficiary recorded in the advanced policy information corresponding to the policyholder shall receive. Next, Step 436 is executed to enable the process apparatus to inform the beneficiary of the claim payment amount. On the other hand, if in Step 426, the process apparatus determines that the paid term number of the applicant is shorter than the deferred period recorded in the advanced insurance group, Step 428 is executed to enable the process apparatus to add the paid advanced insurance premium amount of the policyholder to the compensation amount recorded in the advanced insurance group as the claim payment amount that the beneficiary recorded in the advanced policy information corresponding to the policyholder shall receive. Then, Step 436 is executed to enable the process apparatus to inform the beneficiary of the claim payment amount.

Both the basic policy information and the advanced policy information described in the second embodiment can be transacted. The second embodiment then proceeds to Step 429 to enable the process apparatus to receive a policy transaction application of the applicant, in which the policy transaction application indicates that the policyholder desires to transact the basic policy information and the advanced policy information.

Figure 3G:
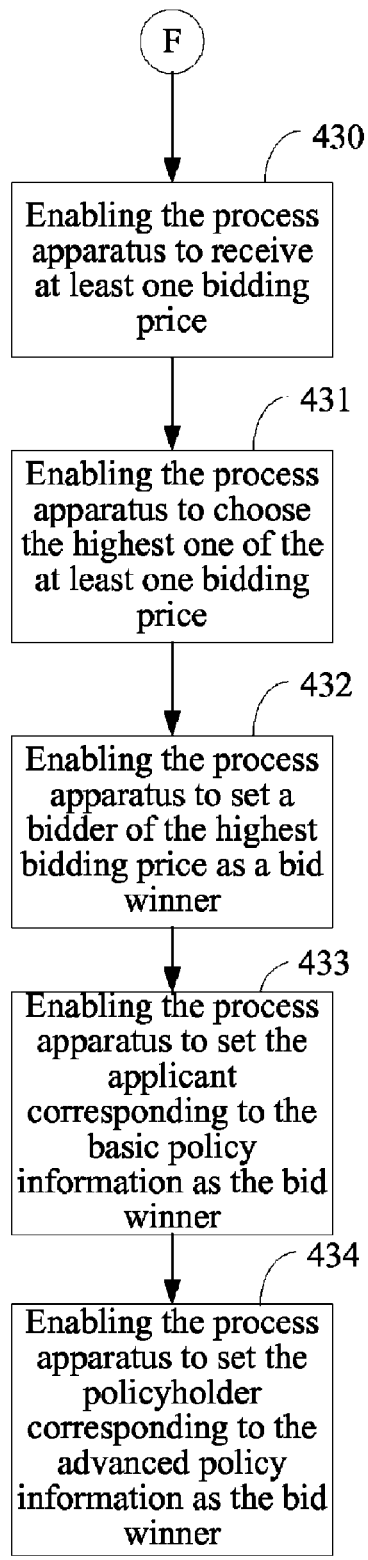
FIG. 3G is a seventh portion of the flowchart of the second embodiment.

Referring to FIG. 3G, Step 430 is executed to enable the process apparatus to receive at least one bidding price. Afterwards, Step 431 is executed to enable the process apparatus to choose the highest one of the at least one bidding price. Step 432 is executed to enable the process apparatus to set a bidder of the highest bidding price as a bid winner. Afterwards, step 433 is executed to enable the process apparatus to set the applicant recorded in the basic policy information as the bid winner. Finally, Step 434 is executed to enable the process apparatus to set the applicant recorded in the advanced policy information as the bid winner. It should be noted that, in this embodiment, the policyholder desires to transact both the basic policy information and the advanced policy information; however, in other examples, the policyholder may choose either of the basic policy information and the advanced policy information to transact, and accordingly, either of the Steps 433 and 434 can be chosen for execution depending on the policy transaction application of the policyholder.

In addition to the aforesaid steps, the second embodiment can also execute the operations and functions set forth in the first embodiment. How the second embodiment executes these operations and functions will be readily appreciated by those of ordinary skill in the art based on the explanation of the first embodiment, and thus will not be further described herein.

According to the above descriptions, the present invention uses the process apparatus to receive the insurance proposal of the applicant according to the basic insurance group, the basic insurance application, the advanced insurance group and the advanced insurance application. Once the insurance proposal is received, collection/payment of the insurance premium and settlement of insurance claims can all be performed by the process apparatus. Thereby, a popular and open insurance platform is formed to simplify the process and improve security of the insurance. This effectively reduces insurance risks for policyholders and underwriting risks for insurance companies, and effectively satisfies insurance needs of the policyholders without rejecting the insurance proposal because of the age or other subjective factors, thus overcoming the drawbacks of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mutual insurance method performed by a process apparatus, the process apparatus being connected to a database storing a basic insurance group and a plurality of basic policy information corresponding to the basic insurance group, each of the basic policy information recording a name of an mutual-aid person and a name of a beneficiary, the basic insurance group recording a unit insurance premium amount, an deferred period, a gross insurance premium amount, and a compensation amount, the mutual insurance method comprising the following steps of:
    (a) enabling the process apparatus to receive a basic insurance application of an applicant;
    (b) enabling the process apparatus to confirm that a number of applicants of the basic insurance group is smaller than a number of mutual-aid persons of the basic insurance group;
    (c) enabling the process apparatus to, generate basic policy information of the applicant according to the basic insurance group and the basic insurance application and store the basic policy information in the database;
    (d) enabling the process apparatus to, confirm that the number of applicants of the basic insurance group is equal to the number of mutual-aid persons recorded of the basic insurance group;
    (e) enabling the process apparatus to receive at least one death information during a time period, each of the at least one death information recording a dead person's name, each of the at least one dead person's name being consistent with one of the names of the mutual-aid persons, and enabling the process apparatus to calculate a number of the at least one death information as the current death number;
    (f) enabling the process apparatus to determine whether the name of the mutual-aid person of the basic policy information corresponding to the applicant is consistent with any of the at least one dead person's name;
    (g) enabling the process apparatus to multiply the unit insurance premium amount with the current death number as the current basic insurance premium and notify the policyholder of the current basic insurance premium when the name of the mutual-aid person of the basic policy information corresponding to the applicant is inconsistent with any of the at least one dead person's name, wherein the current basic insurance premium is the amount that the policyholder shall pay; and
    (h) enabling the process apparatus to determine whether a number of terms that the applicant has participated is longer than the deferred period when the name of the mutual-aid person of the basic policy information corresponding to the applicant is consistent with one of the at least one dead person's name, enabling the process apparatus to set the gross insurance premium amount as the claim payment amount that the beneficiary shall receive when the process apparatus determines that the number of terms that the applicant has participated is longer than the deferred period, and enabling the process apparatus to add an insurance premium amount paid by the policyholder to the compensation amount as a claim payment amount that the beneficiary shall receive when the process apparatus determines that the number of terms that the applicant has participated is shorter than the deferred period.

2. The mutual insurance method as claimed in claim 1, wherein the database further stores an advanced insurance group, the mutual insurance method further comprises the following steps of:
    (i) enabling the process apparatus to receive an advanced insurance application of the applicant;
    (j) enabling the process apparatus to confirm that a number of applicants of the advanced insurance group is smaller than a number of mutual-aid persons of the advanced insurance group, wherein the applicant in the waiting list entitles to participate the basic insurance group;
    (k) enabling the process apparatus to generate advanced policy information of the applicant according to the advanced insurance group and the advanced insurance application;
    (l) enabling the process apparatus to store the advanced policy information in the database;
    (m) enabling the process apparatus to, subsequent to the step (k), confirm that the number of applicants of the advanced insurance group is equal to the number of mutual-aid persons recorded in the advanced insurance group;
    (n) enabling the process apparatus to calculate a current advanced insurance premium of the policyholder according to the advanced policy information and a current death number corresponding to the advanced insurance group; and
    (o) enabling the process apparatus to notify the policyholder of the current advanced insurance premium;
wherein the number of mutual-aid persons of the advanced insurance group is smaller than the number of mutual-aid persons of the advanced insurance group.

3. The mutual insurance method as claimed in claim 2, wherein the database stores a plurality of advanced policy information corresponding to the advanced insurance group respectively, each of the advanced policy information records a name of an mutual-aid person, the advanced insurance group further records a unit insurance premium amount, and the mutual insurance method further comprises the following steps of:
   enabling the process apparatus to, prior to the step (n), receive at least one death information during the time period, each of the at least one death information recording a dead person's name, and each of the at least one dead person's name being consistent with one of the names of the mutual-aid persons;
   enabling the process apparatus to, prior to the step (n), calculate a number of the at least one death information as the current death number corresponding to the advanced insurance group; and
   enabling the process apparatus to, prior to the step (n), determine that the name of the mutual-aid person of the advanced policy information corresponding to the applicant is inconsistent with any of the at least one dead person's name;
   wherein the step (n) is to enable the process apparatus to multiply the unit insurance premium amount of the advanced insurance group with the current death number corresponding to the advanced insurance group as the current advanced insurance premium that the policyholder participating the advanced insurance shall pay.

4. The mutual insurance method as claimed in claim 2, wherein the database stores a plurality of advanced policy information corresponding to the advanced insurance group respectively, each of the advanced policy information records a name of an mutual-aid person, the advanced insurance group further records an deferred period and a compensation amount, the advanced policy information of the applicant records a name of a beneficiary, and the mutual insurance method further comprises the following steps of:
   enabling the process apparatus to, prior to the step (n), receive at least one death information during the time period, each of the at least one death information recording a dead person's name, and each of the at least one dead person's name being consistent with one of the names of the mutual-aid persons;
   enabling the process apparatus to, prior to the step (n), calculate a number of the at least one death information as the current death number corresponding to the advanced insurance group;
   enabling the process apparatus to, prior to the step (n), determine that the name of the mutual-aid person of the advanced policy information corresponding to the applicant is consistent with one of the at least one dead person's name; and
   enabling the process apparatus to determine that a number of terms that the applicant has participated for the advanced insurance group is shorter than the deferred period of the advanced insurance group;
   wherein the step (n) is to enable the process apparatus to add an advanced insurance premium amount paid by the policyholder to the compensation amount as a claim payment amount that the beneficiary shall receive.

5. The mutual insurance method as claimed in claim 2, wherein the database stores a plurality of advanced policy information corresponding to the advanced insurance group respectively, each of the advanced policy information records a name of an mutual-aid person, the advanced insurance group further records an deferred period and a gross insurance premium amount, the advanced policy information of the applicant records a name of a beneficiary, and the mutual insurance method further comprises the following steps of:
   enabling the process apparatus to, prior to the step (n), receive at least one death information during the time period, each of the at least one death information recording a dead person's name, and each of the at least one dead person's name being consistent with one of the names of the mutual-aid persons;
   enabling the process apparatus to, prior to the step (n), calculate a number of the at least one death information as the current death number corresponding to the advanced insurance group;
   enabling the process apparatus to, prior to the step (n), determine that the name of the mutual-aid person of the advanced policy information corresponding to the applicant is consistent with one of the at least one dead person's name; and
   enabling the process apparatus to determine that a number of terms that the applicant has participated for the advanced insurance group is longer than the deferred period of the advanced insurance group;
   wherein the step (n) is to enable the process apparatus to set the gross insurance premium amount of the advanced insurance group as the claim payment amount that the beneficiary shall receive.

6. The mutual insurance method as claimed in claim 1, further comprising the following steps of:
   enabling the process apparatus to receive a policy transaction application of the policyholder, the policy transaction application indicating that the policyholder attempts to transact the basic policy information;
   enabling the process apparatus to receive at least one bidding price;
   enabling the process apparatus to choose the highest one of the at least one bidding price;
   enabling the process apparatus to set a bidder, corresponding to the highest bidding price, as a bid winner; and
   enabling the process apparatus to set the applicant, corresponding to the basic policy information, as the bid winner.

7. The mutual insurance method as claimed in claim 2, further comprising the following steps of:
   enabling the process apparatus to receive a policy transaction application of the policyholder, the policy transaction application indicating that the policyholder attempts to transact the advanced policy information;
   enabling the process apparatus to receive at least one bidding price;
   enabling the process apparatus to choose the highest one of the at least one bidding price;
   enabling the process apparatus to set a bidder corresponding to the highest bidding price as a bid winner; and
   enabling the process apparatus to set the applicant, corresponding to the advanced policy information, as the bid winner.

8. A process apparatus, being connected to a database, the database storing a basic insurance group and a plurality of basic policy information corresponding to the basic insurance group, each of the basic policy information recording a name of an mutual-aid person and a name of a beneficiary, the basic insurance group recording a unit insurance premium amount, an deferred period, a gross insurance premium amount, and a compensation amount, the process apparatus comprising:
   a transceiver, being configured to receive a basic insurance application of an applicant;

a generation module, being configured to generate basic policy information of the applicant according to the basic insurance group and the basic insurance application, and store the basic policy information in the database;

a verification module, being configured to, before the generation module generates the basic policy information, confirm that a number of applicants of the basic insurance group is smaller than a number of mutual-aid persons recorded in the basic insurance group and, after the generation module generates the basic policy information, confirm that the number of applicants of the basic insurance group is equal to the number of mutual-aid persons recorded in the basic insurance group; and a calculation module, being configured to calculate a current basic insurance premium of a policyholder according to the basic policy information and a current death number corresponding to the basic insurance group;

wherein the transceiver further receives at least one death information during a time period before the calculation performed by the calculation module, each of the at least one death information records a dead person's name, each of the at least one dead person's name is consistent with one of the names of the mutual-aid persons, the calculation module further calculates a number of the at least one death information as the current death number, wherein verification module further determine whether the name of the mutual-aid person of the basic policy information corresponding to the applicant is consistent with any of the at least one dead person's name, when the name of the mutual-aid person of the basic policy information corresponding to the applicant is inconsistent with any of the at least one dead person's name, the calculation module multiplies the unit insurance premium amount with the current death number as the current basic insurance premium, the current basic insurance premium is the amount that the policyholder shall pay, and the transceiver further transmits the current basic insurance premium to the applicant, and when the name of the mutual-aid person of the basic policy information corresponding to the applicant is consistent with one of the at least one dead person's name, the verification module further determines whether a number of terms that the applicant has participated is longer than the deferred period, the calculation module sets the gross insurance premium amount as the claim payment amount that the beneficiary shall receive when the number of terms that the applicant has participated is longer than the deferred period, and the calculation module adds an insurance premium amount paid by the policyholder to the compensation amount as a claim payment amount that the beneficiary shall receive when the number of terms that the applicant has participated is shorter than the deferred period.

9. The process apparatus as claimed in claim 8, wherein the database further stores a advanced insurance group:

the transceiver is further configured to receive a advanced insurance application of the applicant;

the generation module is further configured to generate advanced policy information of the applicant according to the advanced insurance group and the advanced insurance application and store the advanced policy information in the database;

the verification module is further configured to, after the generation module generates the advanced policy information, confirm that a number of applicants of the advanced insurance group is equal to a number of mutual-aid persons recorded in the advanced insurance group; and the calculation module is further configured to calculate a current advanced insurance premium of the policyholder according to the advanced policy information and a current death number corresponding to the advanced insurance group;

wherein the verification module is further configured to, before the generation module generates the advanced policy information, confirm that the number of applicants of the advanced insurance group is smaller than the number of mutual-aid persons recorded in the advanced insurance group, the transceiver is further configured to transmit the current advanced insurance premium to the policyholder, and the number of mutual-aid persons of the advanced insurance group is smaller than the number of mutual-aid persons of the advanced insurance group.

10. The process apparatus as claimed in claim 9, wherein the database further stores a plurality of advanced policy information corresponding to the advanced insurance group respectively, each of the of advanced policy information records a name of an mutual-aid person, the advanced insurance group further records a unit insurance premium amount, the transceiver is further configured to receive at least one death information during the time period, each of the at least one death information records a dead person's name, each of the at least one dead person's name is consistent with one of the names of the mutual-aid persons, the calculation module is further configured to calculate a number of the at least one death information as the current death number corresponding to the advanced insurance group, the verification module is further configured to, before the calculation module performs the calculation, determine that the name of the mutual-aid person of the advanced policy information corresponding to the applicant is inconsistent with any of the at least one dead person's name, and the calculation module is configured to multiply the unit insurance premium amount of the advanced insurance group with the current death number corresponding to the advanced insurance group as the current advanced insurance premium that the policyholder participating the advanced insurance shall pay.

11. The process apparatus as claimed in claim 9, wherein the database further stores a plurality of advanced policy information corresponding to the advanced insurance group respectively, each of the advanced policy information records a name of an mutual-aid person, the advanced insurance group further records an deferred period and a compensation amount, the advanced policy information of the applicant records a name of a beneficiary, the transceiver is further configured to receive at least one death information during the time period, each of the at least one death information records a dead person's name, each of the at least one dead person's name is consistent with one of the names of the mutual-aid persons, the calculation module is further configured to calculate a number of the at least one death information as the current death number corresponding to the advanced insurance group, the verification module is further configured to, before the calculation module performs the calculation, determine that the name of the mutual-aid person of the advanced policy information corresponding to the applicant is consistent with one of the at least one dead person's name and that a number of terms that the applicant has participated for the advanced insurance group is shorter than the deferred period of the advanced insurance group, and the calculation module is further configured to add an advanced insurance premium amount paid by the policyholder to the compensation amount of the advanced insurance group as a claim payment amount that the beneficiary shall receive.

12. The process apparatus as claimed in claim 9, wherein the database further stores a plurality of advanced policy information corresponding to the advanced insurance group respectively, each of the advanced policy information records a name of an mutual-aid person, the advanced insurance group further records an deferred period and a gross insurance premium amount, the advanced policy information of the applicant records a name of a beneficiary, the transceiver is further configured to receive at least one death information during the time period, each of the at least one death information records a dead person's name, each of the at least one dead person's name is consistent with one of the names of the mutual-aid persons, the calculation module is further configured to calculate a number of the at least one death information as the current death number corresponding to the advanced insurance group, the verification module is further configured to, before the calculation module performs the calculation, determine that the name of the mutual-aid person of the advanced policy information corresponding to the applicant is consistent with one of the at least one dead person's name and that a number of terms that the applicant has participated for the advanced insurance group is longer than the deferred period of the advanced insurance group, and the calculation module is configured to set the gross insurance premium amount of the advanced insurance group as the claim payment amount that the beneficiary shall receive.

13. The process apparatus as claimed in claim 8, wherein:

the transceiver is further configured to receive a policy transaction application from the applicant and at least one bidding price, the policy transaction application indicates that the policyholder attempts to transact the basic policy information; and the verification module is further configured to choose the highest one of the at least one bidding price, set a bidder corresponding to the highest bidding price as a bid winner and set the applicant corresponding to the basic policy information as the bid winner.

14. The process apparatus as claimed in claim 9, wherein:

the transceiver is further configured to receive a policy transaction application from the applicant and at least one bidding price, the policy transaction application indicates that the policyholder attempts to transact the advanced policy information; and the verification module is further configured to choose the highest one of the at least one bidding price, set a bidder corresponding to the highest bidding price as a bid winner and set the applicant corresponding to the advanced policy information as the bid winner.

* * * * *